COUNTING DEVICE

Filed Aug. 15, 1961

INVENTORS
CHARLES A. McKAY
SEARLE G. NEVIUS
BY Elliott & Pastoriza
ATTORNEYS

United States Patent Office 3,167,750
Patented Jan. 26, 1965

3,167,750
COUNTING DEVICE

Charles A. McKay, Sepulveda, and Searle G. Nevius, Playa Del Rey, Calif., assignors to The Foxboro Company, a corporation of Massachusetts
Filed Aug. 15, 1961, Ser. No. 131,679
8 Claims. (Cl. 340—174)

This invention relates to counting devices and more particularly to an improved "counting" or frequency dividing circuit employing magnetic cores for providing an output pulse only after a given number of input pulses have been "counted" or received.

The present invention constitutes a continuation-in-part of our co-pending application Serial No. 20,087, filed April 5, 1960, now abandoned, and entitled "Counting Device."

The operation of the present invention as well as that in our above-mentioned co-pending application is based on the use of a magnetic core for storing a given number of input pulses. These input pulses progressively "step" the core from a first state of saturation towards a second state of saturation. After a number of input pulses have been stored sufficient to saturate the core to its second state, the core is switched back to its first state to yield a single output pulse.

In order that a consistent number of input pulses effect the desired stepping of the core from a first to a second state of saturation, the input pulses themselves must be standardized or of constant volt-second area. Therefore, there is usually required a standardizing stage which is responsive to the pulses to be counted to provide a series of standardized or constant energy pulses for the magnetic core.

The primary advantage of a magnetic core as a storage or accumulating element resides in its relatively small size and its ability to count more than two pulses before providing a single output pulse. Thus, far fewer cascaded stages are necessary with a magnetic core as the basic element than is the case with conventional binary counters to achieve a given division. This reduction in stages is important where miniaturization is desired.

Even with the use of magnetic cores, however, problems of miniaturizing the counting circuit are present. Principally, these problems arise from the need of dual power supplies for respectively providing saturation current for the cores involved and for biasing the transistor switching means employed in conjunction with the magnetic core for resetting the core state. Oftentimes the power supply circuitry will require as much physical space and as many components as the counter itself. Any means, therefore, by which the number of voltage sources can be reduced without resulting in a constant drain of power will result in a considerable savings in size and weight.

Other problems encountered with known magnetic core type counters are their limited range of operation, the requirement of idling current which will tend to drain available power and is serious when batteries or solar cells are used, and variations in operation as a consequence of temperature changes. When counters are employed in missile work, the ambient temperature can vary between wide limits resulting in instability of the core as well as in any solid state switching elements used.

With all of the foregoing in mind, it is thus a primary object of the present invention to provide a greatly improved counting device in which the foregoing problems are substantially eliminated.

More particularly, it is an object to provide an improved counting device in which only a single power supply providing a single voltage source is required to energize the device to the end that a considerable simplification in the circuitry with resultant decrease in bulk and mass and decrease in the number of components necessary are realized.

Another object is to provide an improved counter in which the number of input pulses required to provide a single output pulse may be varied over a larger range than has been possible with prior art devices.

Still another important object is to provide a counting device in which no idle current is required so that power is employed only during the time that actual switching is taking place.

Another important object of this invention is to provide temperature compensating means so that reliable and stable operation is assured over considerably larger temperature variations than has been possible heretofore.

Another object is to provide an improved standardizing circuit which itself can serve as a simple binary counter yielding one output pulse in response to every two input pulses received or may be altered to a one-to-one ratio, and wherein the output pulse is of an absolutely constant energy or volt-second area.

The manner in which the foregoing objects are realized will be understood by referring to a preferred embodiment of the improved counting circuit as illustrated in the accompanying drawings, in which.

Figure 1:
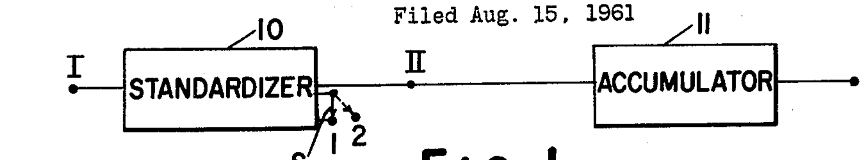
FIGURE 1 is a simple block diagram illustrating the standardizing and accumulator stages of the counter.

Referring first to FIGURE 1, the counting device comprises a standardizing stage 10 and accumulator stage 11. The standardizing stage 10 serves to provide a series of constant energy pulses proportional in number to a series of input trigger pulses. In accordance with a feature of this invention, the standardizing stage 10 includes a switch S which, when closed or placed on terminal 1 as schematically illustrated in FIGURE 1, effects first connections within the standardizer which will provide a succession of alternately positive and negative constant output pulses and when in open or on the second terminal 2 will provide twice the number of constant energy output pulses. The accumulator stage in turn provides a single output pulse only when a given number of constant energy pulses from the standardizing stage 10 has been received.

Figure 2:
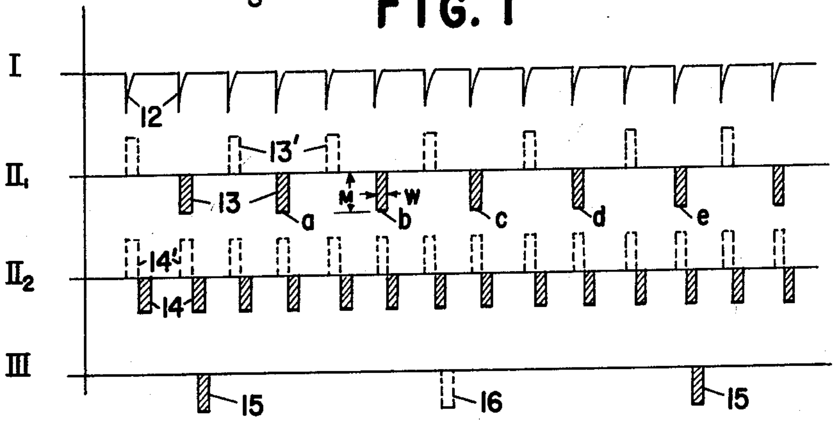
FIGURE 2 is a series of time plots representing pulse conditions existing at various points in the block diagram of FIGURE 1.

Referring to FIGURE 2, for example, there is shown in the upper plot I a series of input electrical pulses 12 received at the correspondingly indicated input terminal 1 of the standardizing stage 10 of FIGURE 1. The second plot $11_2$ illustrates a series of constant energy pulses 13, 13' provided when the switch arm S of FIGURE 1 is on the number 1 terminal. These constant energy pulses correspond in number to the number of input pulses but alternately reverse in polarity as indicated by the dotted line constant energy pulses 13'. At the output portion of the standardizer stage, there is provided a steering diode which selects only pulses of the same polarity so that there is only one constant energy output pulse 13 for every two input pulses 12. Each of the pulses 13 are of precisely the same pulse width $w$ and pulse amplitude M.

When the switch arm S is in the open or on the number 2 terminal in FIGURE 1, the constant energy output pulses appear as shown at 14 and 14' for plot $II_2$. In this case, there is provided a positive pulse immediately followed by a negative pulse for each input pulse 12. Thus, when these pulses are passed through the steering diode, there is provided a series of constant energy pulses of the same polarity as indicated at 14 which equal in number the number of input pulses 12. By throwing the switch arm S from the position 2 to the position 1, a division of two can be effected by the standardizing stage 10.

Plot III shows output pulses 15 from the accumulator stage. In the example chosen for illustrative purposes, the accumulator is designed to deliver one output pulse for every five constant energy input pulses received. Therefore, when the switch arm S is in the number 1 terminal position, there will be provided the solid line output pulses 15 shown in plot III, whereas if the switch arm S is in the number 2 or open terminal position, then twice as many output pulses will be generated as indicated by both the solid line pulses 15 and dotted line pulse 16 in plot III.

Figure 3:
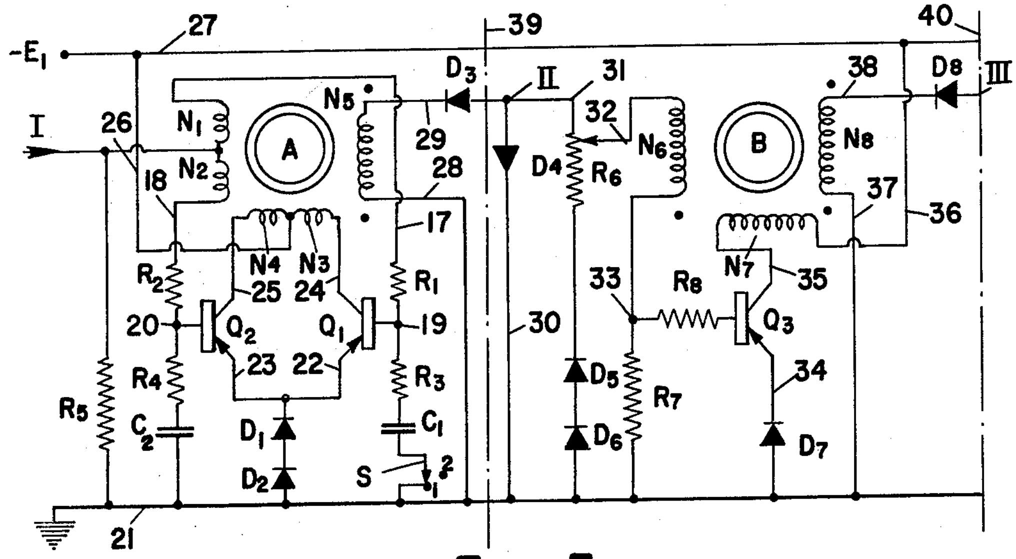
FIGURE 3 is a schematic circuit diagram of the components making up the blocks of FIGURES 1 and 2; and, FIGURE 4 illustrates a square hysteresis loop characteristic for a magnetic core useful in explaining the operation of the device.

Referring to FIGURE 3, the preferred elements making up the standardizer and accumulator stages of FIGURE 1 will now be briefly described. As shown to the left in FIGURE 3, the input I connects to the center of split input coils $N_1$ and $N_2$ wound about a magnetic core A. The outer ends of these coils connect through leads 17, 18 and resistances $R_1$, $R_2$ to base terminals 19 and 20 of a pair of switching transistors $Q_1$ and $Q_2$, respectively. Also connected between the base terminals and ground are first and second damping circuits comprising series connected resistances and condensers $R_3$, $C_1$, and $R_4$, $C_2$, respectively. The second damping circuit $R_4$ and $C_2$ is connected between the base terminal 20 and a ground lead 21. The first damping circuit $R_3$, $C_1$ connects the base 19 to ground lead 21 only when the switch S is on the first terminal 1 and isolates the base 19 from ground when the switch arm S is on the second or open terminal 2.

The switching transistors $Q_1$ and $Q_2$ respectively include emitter terminals 22 and 23 connected together as shown. A bias setting diode means comprising a pair of series connected diodes $D_1$ and $D_2$ in turn is connected between the emitter terminals and the ground lead 21. The collector terminals 24 and 25 respectively connect to the outer ends of a driving coil means wound about the magnetic core A. This coil means itself is center-tapped to define half-coils $N_3$ and $N_4$ by a lead 26 connecting to a single power supply providing a single voltage $-E_1$ on line 27.

An output winding $N_5$ wound about the magnetic core A has one end connected through lead 28 to the ground lead 21 and its other end connected by lead 29 through a steering diode $D_3$ to an output junction point II corresponding to the input to the accumulator stage similarly designated II in FIGURE 1. A clamping diode $D_4$ is connected between the junction point II and the ground lead 21 through lead 30.

The input trigger pulses 12 to the standardizing circuit described above are provided across a resistance $R_5$, and preferably these trigger pulses are shaped as indicated in plot I of FIGURE 2 and are all of negative polarity for the particular circuit arrangement shown.

The accumulator stage includes resistance means comprised of a resistance $R_6$ and first and second diodes $D_5$ and $D_6$ connected in series in a line 31 passing from the junction point II to the ground lead 21. An input winding $N_6$ is wound about a storage core B and has one end connected by means of a tap 32 to the resistance $R_6$ so that a proportional part of each constant energy pulse applied across this resistance and the first and second diodes $D_5$ and $D_6$ is tapped off. The other end of the input winding $N_6$ passes to a junction point 33 and thence through a fixed resistance $R_7$ to the ground lead 21.

Also connected to the junction point 33 is a current limiting resistance $R_8$ connecting to the base of a switching transistor $Q_3$ serving as a reset switching means for the core B of the accumulator. The emitter terminal 34 of the transistor $Q_3$ includes a bias setting diode $D_7$, the other side of which connects to the ground lead 21. The collector terminal 35 in turn passes to one side of a reset coil $N_7$ wound about the storage core B. The other end of the reset coil $N_7$ connects directly to the constant voltage source on the line 27 through lead 36 as shown.

The output pulse from the accumulator stage is derived from an output coil $N_8$ wound about the storage core B. The lower end of coil $N_8$ is grounded through lead 37 and the upper end connects through an output lead 38 to a steering diode $D_8$ identical to the diode $D_3$.

The vertical dashed lines 39 and 40 of FIGURE 3 separate the standardizer from the accumulator stage. Identical accumulator stages corresponding to the circuit between the vertical lines 39 and 40 may be cascaded to the output of the accumulator stage shown to provide a cascaded network wherein the constant energy output pulse from each accumulator stage will be accumulated in the next accumulator stage, etc.

Figure 4:
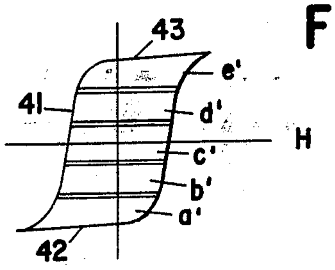

FIGURE 4 illustrates a square hysteresis loop 41 characteristic of both the magnetic cores A and B. The opposite limits of saturation are indicated by the lower and upper lines 42 and 43 respectively. The total area encompassed within the hysteresis loop 37 is a measure of the total energy that may be stored within the magnetic core. The letters *a'*, *b'*, *c'*, *d'*, and *e'* designate discrete areas or steps constituting given quantities of energy.

In operation, assume first that the switch arm S in the standardizer circuit is closed or on the number 1 terminal. The electrical input pulses 12 received at the input I and fed to the center of the split coils $N_1$ and $N_2$ are of a polarity and magnitude sufficient to cause one or the other of the transistors $Q_1$ and $Q_2$ to conduct. The state of the magnetic core A will determine which transistor will conduct. With the core A saturated in one direction, one of the drive windings $N_3$ or $N_4$ of the coil means will present a relatively high impedance in one of the transistor collector circuits while the other winding in the other transistor collector circuit appears as a very low impedance. This difference in impedance results in a proportional difference in gain. Similarly, one of the split input windings $N_1$ or $N_2$ will have a high impedance relative to the other.

Assuming core A is saturated in a direction caused by current through winding $N_3$, as would result when $Q_1$ is in conduction, the collector circuit winding $N_4$ and split input winding $N_1$ will appear as having high impedances, and the next pulse occurring at the center of the split windings $N_1$ and $N_2$ will pass through $N_2$, $R_2$, the base base terminal 20 of $Q_2$, $R_4$, and condenser $C_2$ to the ground lead 21, to cause $Q_2$ to go into conduction. Upon conduction of $Q_2$, current from ground will pass through the diodes $D_2$ and $D_1$ and through the transistor $Q_2$, collector lead 25, coil $N_4$ and center tap lead 26 to $-E_1$ on the lead 27. The winding $N_4$ is inductively coupled to $N_2$ and will generate feedback current in $N_2$ to pass to the base 20 of the transistor $Q_2$. Continued conduction of the transistor $Q_2$ is thus maintained by this feedback.

When the core A is saturated in its other direction, the rate of change of flux therein becomes zero and the feedback coupling between $N_4$ and $N_2$ ceases. With no feedback, conduction of transistor $Q_2$ is no longer sustained, and with no input current, transistor $Q_2$ cuts off and the core will remain saturated in its new state until the next input pulse occurs. When the next pulse occurs, the above action is repeated except that the transistor $Q_1$ is caused to conduct since coils $N_2$ and $N_3$ now exhibit high impedances. Conduction is maintained by feedback between the coils $N_3$ and $N_1$. The current through the coil $N_3$ will reverse the state of saturation of the core A and again when saturation in the opposite state occurs, there will no longer be feedback between the coils $N_3$ and $N_1$, and transistor $Q_1$ will cut off. With the core back in its original state, the impedance of coils $N_1$ and $N_4$ will appear large and the next pulse will thus start conduction of transistor $Q_2$ to repeat the process.

The series connected resistance and condensers $R_3$ and $C_1$ and $R_4$ and $C_2$ provide damping to insure stable operation. When the damping is removed from the base 19 of the transistor $Q_1$ by moving the switch arm S from the terminal 1 to the terminal 2, the core A will be switched through a complete cycle upon reception of each pulse. In other words, a switching from the first state of saturation to the second state and then back to the first state will take place in response to each input pulse as described in conjunction with the plot $II_2$ in FIGURE 2.

The switching of the magnetic core A between its opposite limits of saturation will induce an output pulse in the output coil $N_5$ each time the saturation is reversed. Thus, the various series of output pulses as described in conjunction with FIGURE 2 will be provided, depending upon the position of the switch arm S. Since the opposite polarity limits defining saturation of the core as illustrated in FIGURE 4 at 42 and 43 exhibit no appreciable slope, the output energy in each pulse generated in the coil $N_5$ will be constant and independent of the length of time of conduction of either of the transistors.

As described briefly heretofore, the diode $D_3$ selects the proper polarity pulse for the accumulator stage, which pulses will occur at a frequency depending upon the position of the switch arm S.

The storage magnetic core B in the accumulator stage prior to receiving any of the constant energy pulses is in a first state of saturation which may be represented by the lower saturation limit 42 in FIGURE 4. The transistor $Q_3$ forming part of the reset circuit is held in its off or quiescent state by diode $D_7$ in the absence of any pulses applied to the input winding $N_6$. When one of the constant energy pulses such as the pulse "*a*" in plot $II_1$ of FIGURE 2 is received in the coil $N_6$, the resulting current will change the state of core B by a discrete amount to step the core from the first state of saturation towards the second state of saturation.

For example, with reference to FIGURE 4, the application of pulse "*a*" will result in a change of state from the line 42 to the upper line defining the energy area *a'*. This slight change in magnetization is insufficient to saturate or switch the core B to its second state of saturation. As described in FIGURE 4, however, the core is stepped towards the second state of saturation by the pulse. The subsequent pulses "*b*," "*c*," "*d*," and "*e*" will similarly step the core further towards its second state of saturation as indicated by the energy areas *b'*, *c'*, *d'*, and *e'* in FIGURE 4. This stepping is a consequence of the fact that the change in the core magnetization is a function of its previous state. The impedance of the input coil $N_6$ is a function of the state of saturation of its core B so that the voltage appearing at the junction point 33 between the coil $N_6$ and fixed resistance $R_7$ will constitute a function of the impedance of the coil $N_6$. This voltage is not sufficient to cause conduction of the transistor $Q_3$ until a given voltage level is reached determined by the impedance of the coil $N_6$ at the time the second state of saturation of the core B is attained.

Therefore, when the last constant energy pulse "*e*" of plot $II_1$ of FIGURE 2 is received, the upper limit of the second state of saturation of the storage core B will be reached as indicated in FIGURE 4, and at this point, the impedance of the winding $N_6$ will have decreased sufficiently so that the voltage at the junction point 33 at the base of the transistor $Q_3$ provides sufficient input drive to switch the transistor $Q_3$ into conduction. Upon conduction of transistor $Q_3$, current from ground through diode $D_7$ and lead 34 is passed up through the transistor and from collector lead 35 through coil $N_7$ to $-E_1$ on lead 27. The winding $N_6$ in turn is of the correct polarity to provide regenerative feedback from coil $N_6$ to the base of $Q_3$, thus maintaining $Q_3$ conducting. The core B is thus switched from its second state of saturation back to its first state of saturation. When reset to this first state of saturation, there is no longer inductive coupling between coils $N_7$ and $N_6$ and $Q_3$ is switched off. The core B is now ready to accumulate another set of five constant energy pulses.

The output pulse from the accumulator stage is induced in the output coil $N_8$ when the storage core B is switched back to its first state of saturation from its second state of saturation. The result is thus a series of constant energy output pulses which will occur at a rate determined by the input frequency and the given number of constant energy pulses stored in the core B between its saturation limits.

The diode $D_4$ at the input stage of the accumulator insures that the pulse received at the input of the accumulator circuit is the only pulse present. Thus, there is prevented any feedback of spurious pulses from subsequently cascaded counter circuits.

The adjustable tap 32 for the input coil $N_6$ in the accumulator stage enables a given proportion of the constant energy pulses supplied by the standardizer to be tapped off and applied to the storage magnetic core B. Thus, by decreasing the magnitude of these pulses, more pulses may be accumulated before saturation is reached. This provision of a tap in the circuit as shown enables a far wider range of adjustment than has been possible with prior art circuits and constitutes an important feature of the present invention.

The diodes $D_5$ and $D_6$ in the resistance means forming part of the input circuit of the accumulator serve as temperature compensating diodes for the bias setting diode $D_7$ and the transistor $Q_3$. Resistance changes in the transistor $Q_3$ and diode $D_7$ as a consequence of temperature changes are exactly compensated for by the corresponding resistance changes effected in the diodes $D_5$ and $D_6$, respectively. Stated differently, any change of the voltage at the base of the transistor $Q_3$ required to cause conduction of the transistor $Q_3$ as a consequence of temperature change is compensated for by a change in the proportional quantity of the constant energy pulses provided by the tap 32 since corresponding resistance changes will occur in the diodes $D_5$ and $D_6$. Stable and reliable operation is insured over wide temperature variations.

Since the output pulse from the accumulator stage is of constant energy several such accumulator stages may be cascaded, only one standardizer stage being required for the first accumulator. It should be understood, however, that the accumulator stage itself is all that is necessary to provide a counting device providing constant energy pulses are provided therefor. It is preferable, however, to employ a standardizing circuit of the design shown for providing these constant energy pulses since the standardizing circuit can be provided with a magnetic core such as the core A of identical characteristics to the core B. With this arrangement and the two circuits working together, any variations in the characteristics of the cores themselves as a consequence of ambient temperature or other environmental changes will occur in both cores simultaneously and thus a self-compensation network is provided.

Most importantly, however, with the circuit as described, only a single voltage value is required of the power supply. Separate biasing voltages have been required in the past but are now avoided with the result of a major decrease in size, weight, and number of components required. Such simplification constitutes an important advance, particularly when size and weight are at a premium.

Since the output pulses from the standardizing stage as well as from the accumulator or counting stage are all of constant energy, the circuits can be advantageously employed for other functions such as for converting frequency to voltage levels by simply feeding the constant energy output pulses into an integrating or summing circuit.

The various uses to which the improved standardizing and accumulator stages of the counting device of this invention may be put are therefore not to be thought of as limited to any one particular operation.

What is claimed is:

1. A counting device comprising, in combination: a standardizing stage for receiving a series of electrical input pulses to be counted, said standardizing stage generating a series of constant energy pulses of identical polarity to each other in response to said input pulses, the number of said constant energy pulses being directly proportional to the number of said input pulses; and an accumulator stage connected to said standardizing stage to receive said constant energy pulses, said accumulator stage including input resistance means, said constant energy pulses being applied across said resistance means; a magnetic storage core; an input coil inductively coupled to said storage core, said input coil having one end connected to said resistance means for passing a proportional part of said constant energy pulses to said storage core to step said core from a first state of saturation towards a second state of saturation; a fixed resistance, the other end of said input coil connecting through said fixed resistance to ground; a reset coil inductively coupled to said storage core for switching the saturation of said core from said second state to said first state in response to current passing through said reset coil in a given direction; a power supply consisting of a single voltage source connected to one side of said reset coil; a reset switching means connected between the other side of said reset coil and ground; said reset switching means being responsive to the voltage at the junction point of said other end of said input coil and said fixed resistance to close only when a given voltage is attained at said junction point as determined by the impedance of said input coil when said core reaches its second state of saturation, closing of said reset switching means passing current through said reset coil to switch said core from its second to its first state of saturation; and an output coil inductively coupled to said core to provide a single output pulse each time said storage core is switched from said second state to said first state, said core consisting solely of said input coil, reset coil, and output coil.

2. A counting device according to claim 1, in which said one end of said input coil terminates in adjustable tap means movable along said resistance means so that said proportional part of said constant energy pulses may be varied to change the total number of pulses required to step said core from said first state of saturation to said second state.

3. A counting device according to claim 1, in which said reset means comprises a transistor having emitter, collector, and base terminals, said base terminal being connected to said junction point and said collector terminal being connected to one side of said reset coil; and a bias setting diode connected between said emitter terminal and ground to hold said transistor in a non-conducting state until said given voltage is attained.

4. A counting device according to claim 3, in which said resistance means comprises a resistance and first and second diodes connected in series with said resistance, said diodes having temperature co-efficients of resistance corresponding to those of said transistor and bias setting diode, respectively, whereby temperature compensation is provided.

5. A counting device according to claim 1, in which said standardizing stage includes a magnetic core of substantially identical characteristics as said first mentioned magnetic core in said accumulator stage; means for switching the state of saturation of said latter mentioned magnetic core in response to said input pulses; an output coil means inductively coupled to said latter mentioned magnetic core to provide said constant energy pulses in response to said switching, whereby corresponding variations in the characteristics of said first mentioned magnetic core in response to ambient conditions occur in said latter mentioned magnetic core to provide automatic compensation for said variations.

6. A counting device comprising, in combination: a standardizing stage for providing a series of constant energy pulses proportional in number to a series of input electrical pulses, said standardizing stage including a magnetic core; coil means inductively coupled to said magnetic core for switching the saturation of said core between positive and negative saturation limits in response to current passed through said coil means in one direction and in an opposite direction, respectively; a single power supply providing a single voltage source center-tapped to said coil means; switching means connected between the outer ends of said coil means and ground, said switching means including first connections to render said switching means responsive to successive ones of said input pulses to pass said current successively in alternate directions through said coil means; an output coil inductively coupled to said core to yield a series of alternate polarity constant energy signals corresponding in number to said input pulses, said switching means including second connections to render said switching means responsive to each of said input pulses to pass said current in alternate directions through said coil means so that said output coil provides signals comprising two constant energy pulses of opposite polarity in response to each input pulse; and diode means connected to said output coil for selecting like polarity pulse from said output signals to provide said series of constant energy pulses of identical polarity to each other, the number thereof being one-half the number of said input pulses when said first connections are effected, and the number thereof being exactly equal to the number of said input pulses when said second connections are effected.

7. A counting device according to claim 6, including split input coils inductively coupled to said core and having impedances which are a function of the saturation state of said core, said input pulses being applied to the inner ends of said split input coils, said switching means including first and second transistors having collector, emitter, and base terminal leads, the outer ends of said coil means being connected to said collector leads, said emitter leads being connected together; bias setting diode means connected between said emitter leads and ground, said base leads connecting to the outer ends of said split input coils, respectively; and damping circuits comprising first and second series connected resistances and condensers connected to said base terminals, respectively, said second damping circuit being connected to ground, said first connections connecting said first damping circuit to ground and said second connections isolating said first damping circuit from ground.

8. A counting circuit according to claim 6, including an accumulator stage connected to receive said constant energy pulses to provide in response to a given number of said constant energy pulses a single output pulse.

References Cited by the Examiner

UNITED STATES PATENTS

| | | | |
|---|---|---|---|
| 2,834,698 | 2/58 | Van Nice et al. | 235—92 |
| 3,102,239 | 8/63 | Tung Chang Chen et al. | 340—174 X |
| 3,109,936 | 11/63 | Rennie | 340—174 X |

IRVING L. SRAGOW, *Primary Examiner.*